United States Patent
Hsu et al.

(10) Patent No.: US 10,480,993 B2
(45) Date of Patent: Nov. 19, 2019

(54) CYLINDRICAL PACKAGE

(71) Applicant: EZCONN CORPORATION, Taipei (TW)

(72) Inventors: Mao-Chieh Hsu, Taipei (TW); Shih-Lung Hsu, Taipei (TW); Jia-Cong Yu, Taipei (TW); Chin-Yin Lan, Taipei (TW)

(73) Assignee: EZCONN CORPORATION, Taipei (TW)

( * ) Notice: Subject to any disclaimer, the term of this patent is extended or adjusted under 35 U.S.C. 154(b) by 313 days.

(21) Appl. No.: 14/794,882

(22) Filed: Jul. 9, 2015

(65) Prior Publication Data
US 2016/0223393 A1 Aug. 4, 2016

(30) Foreign Application Priority Data
Jan. 29, 2015 (TW) .............. 104201401 U

(51) Int. Cl.
*G01J 1/02* (2006.01)
*G01J 1/04* (2006.01)
*G01J 1/42* (2006.01)
*G01J 9/02* (2006.01)

(52) U.S. Cl.
CPC .......... *G01J 1/0271* (2013.01); *G01J 1/0403* (2013.01); *G01J 1/0407* (2013.01); *G01J 1/0488* (2013.01); *G01J 1/4228* (2013.01); *G01J 9/0246* (2013.01); *G01J 2009/0257* (2013.01)

(58) Field of Classification Search
CPC . G01J 2009/0257; G01J 1/4228; G01J 1/0271
See application file for complete search history.

(56) References Cited

U.S. PATENT DOCUMENTS

| | | | | |
|---|---|---|---|---|
| 6,477,190 B1* | 11/2002 | Komiyama | ......... | H01S 5/02248 372/29.01 |
| 6,586,678 B1* | 7/2003 | Rosenberg | .......... | H01S 5/02212 174/520 |
| 2003/0035119 A1* | 2/2003 | Myatt | ................... | H01S 5/0687 356/519 |
| 2004/0074661 A1* | 4/2004 | Schiaffino | ................ | G02B 6/42 174/539 |
| 2004/0163836 A1* | 8/2004 | Kumar | ................ | H01S 5/02212 174/50 |
| 2005/0213882 A1* | 9/2005 | Go | ........................ | G02B 6/4201 385/37 |

(Continued)

FOREIGN PATENT DOCUMENTS

KR 20130083765 A * 7/2013 ......... H01S 5/02292

*Primary Examiner* — Kara E. Geisel
*Assistant Examiner* — Violeta A Prieto
(74) *Attorney, Agent, or Firm* — Min-Lee Teng; Litron Patent & Trademark Office

(57) ABSTRACT

A cylindrical package includes a cylindrical housing; a pedestal at a bottom of a cylindrical space surrounded by the cylindrical housing; an optical splitter in the cylindrical space and over the pedestal; a first photodetector in the cylindrical space and over the pedestal, wherein the first photodetector is configured to be optically coupled to the optical splitter; and a second photodetector in the cylindrical space and over the pedestal, wherein the second photodetector is configured to be optically coupled to the optical splitter.

15 Claims, 6 Drawing Sheets

(56) References Cited

U.S. PATENT DOCUMENTS

| | | | |
|---|---|---|---|
| 2007/0116076 A1* | 5/2007 | Wang | H01S 5/0683 |
| | | | 372/38.07 |
| 2009/0310635 A1* | 12/2009 | Chen | H01S 5/0687 |
| | | | 372/32 |
| 2014/0240698 A1* | 8/2014 | Wagner | G01J 1/4257 |
| | | | 356/218 |
| 2015/0030042 A1* | 1/2015 | Kim | H01S 5/02292 |
| | | | 372/20 |
| 2015/0162723 A1* | 6/2015 | Daiber | H01S 5/141 |
| | | | 372/20 |
| 2016/0154194 A1* | 6/2016 | Kim | G02B 6/4215 |
| | | | 385/33 |
| 2017/0085970 A1* | 3/2017 | Zhang | H04Q 11/0005 |

* cited by examiner

CYLINDRICAL PACKAGE

BACKGROUND OF THE DISCLOSURE

This patent application claims priority of Taiwan Patent Application No. 104201401, filed on Jan. 29, 2015, the entirety of which is incorporated herein by reference.

FIELD OF THE DISCLOSURE

The present disclosure relates to a cylindrical package, and more particularly to a cylindrical package for a wavelength locker.

BRIEF DESCRIPTION OF THE RELATED ART

A traditional wavelength locker assembled with an etalon and two optical detectors is generally packaged with a butterfly or box-type package, in which the wavelength locker is mounted in a coplanar fashion onto a substrate such that its package has a relatively large volume. The traditional wavelength locker is difficult to be integrated with an optical sub-assembly, such as one for a wavelength-division-multiplexed passive optical network (WDM-PON) or optical network unit (ONU).

SUMMARY OF THE DISCLOSURE

The present disclosure provides a cylindrical package, especially known as a TO (transistor outline) package, including a cylindrical housing; a pedestal at a bottom of a cylindrical space surrounded by the cylindrical housing; an optical splitter in the cylindrical space and over the pedestal; a first photodetector in the cylindrical space and over the pedestal, wherein the first photodetector is configured to be optically coupled to the optical splitter; and a second photodetector in the cylindrical space and over the pedestal, wherein the second photodetector is configured to be optically coupled to the optical splitter.

The present disclosure provides a cylindrical package including a pedestal; a wavelength locking module over the pedestal, wherein the wavelength locking module includes an optical splitter configured to split a main optical beam into a first split optical beam and a second split optical beam, an optical interferometer configured to generate interfered optical beams of the second split optical beam, a first photodetector configured to detect a first optical power or intensity of the first split optical beam and generate a first electronic signal in proportion to the first optical power or intensity, and a second photodetector configured to detect a second optical power or intensity of the interfered optical beams incident onto the second photodetector and generate a second electronic signal in proportion to the second optical power or intensity, wherein the second optical power or intensity varies with a wavelength of the second split optical beam; and a housing over the pedestal, wherein the housing covers the wavelength locking module, wherein an opening passing through an upper wall of the housing has the main optical beam pass therethrough. The optical splitter has a first surface having the main optical beam to be incident thereto via the opening and having the first split optical beam to be reflected therefrom to the first photodetector, and a second surface, opposite to the first surface, having the second split optical beam to be emitted therefrom to the optical interferometer.

The present disclosure provides a cylindrical package including a cylindrical housing; a pedestal at a bottom of a cylindrical space surrounded by the cylindrical housing; an optical interferometer in the cylindrical space and over the pedestal; and an photodetector in the cylindrical space and over the pedestal, wherein the photodetector is configured to be optically coupled to the optical interferometer.

These, as well as other components, steps, features, benefits, and advantages of the present disclosure, will now become clear from a review of the following detailed description of illustrative embodiments, the accompanying drawings, and the claims.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
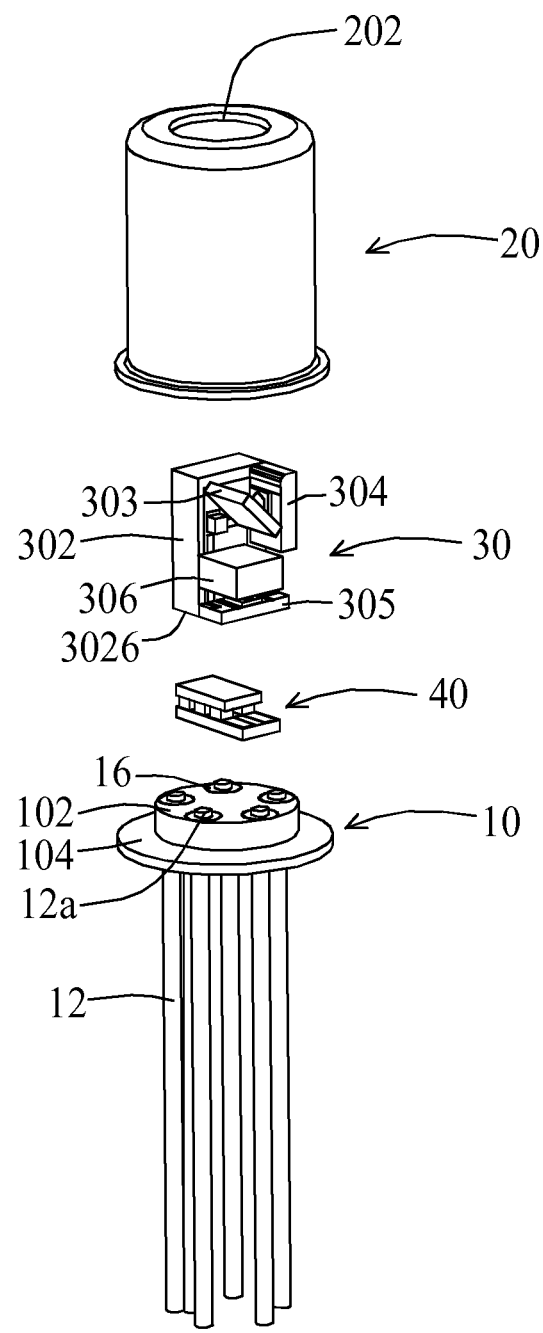
FIG. 1 is an exploded perspective view illustrating a cylindrical package in accordance with an embodiment of the present invention.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed. When the same reference number or reference indicator appears in different drawings, it may refer to the same or like components or steps.

The present application provides a cylindrical package for a wavelength locker with a relatively small volume and a relatively low cost, and its precision is easy to be adjusted.

Figure 2:
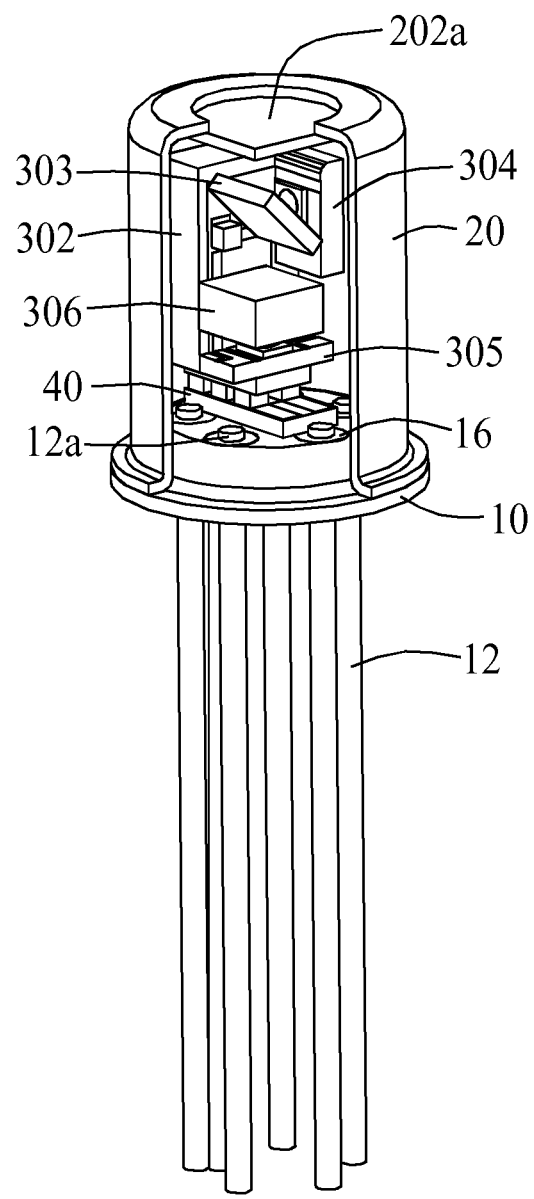
FIG. 2 is a perspective view illustrating the cylindrical package in accordance with the embodiment of the present invention.

Referring to FIGS. 1 and 2, a cylindrical package for a wavelength locker is shown. The cylindrical package is provided with a pedestal 10, a cylindrical housing 20, a wavelength locking module 30 and a thermo-electric cooler 40, wherein the wavelength locking module 30 is mounted over a top surface of the pedestal 10, and the cylindrical housing 20 is mounted over the top surface of the pedestal 10 and covers the wavelength locking module 30.

Referring to FIGS. 1 and 2, the pedestal 10 includes a central circular portion 102 and a peripheral ring-shaped portion 104 integrally formed as a single part, wherein the peripheral ring-shaped portion 104 surrounds the central circular portion 102. The central circular portion 102 protrudes from a top surface of the peripheral ring-shaped portion 104. The pedestal 10 may be made of a metallic material, such as an iron-cobalt-nickel alloy, copper, gold, iron, aluminum, silver, nickel, an alloy of one or more of the above materials or a combination of one or more of the above materials, or a ceramic material. Multiple electrically-conductive metal pins 12 are provided to vertically extend through multiple through holes in the central circular portion 102 of the pedestal 10 respectively, wherein each of the pins 12 has a top end 12a protruding from a top surface of the central circular portion 102 and acting as an electrical pad. The pins 12 may be made of copper, gold, iron, aluminum, silver, nickel, an alloy of one or more of the above materials or a combination of one or more of the above materials. The pedestal 10 includes multiple insulating rings 16 arranged respectively in the through holes in the central circular portion 102 of the pedestal 10 to surround the respective pins 12. The insulating rings 16 are arranged to insulate the respective metal pins 12 from the central circular portion 102 and to fix the respective metal pins 12. The insulating rings 16 may be made of glass sealant, rubber or silicon-containing sealant. An opening 202 passes through an upper wall of the cylindrical housing 20. Alternatively, the cylindrical package may further include an optical lens 202a, as shown in FIGS. 1 and 2, arranged at an inner end of the opening 202, wherein the optical lens 202a may be a focal lens, glass lens, global lens or arcuate lens. The cylindrical housing 20 may be made of a metallic material, such as an iron-cobalt-nickel alloy, copper, gold, iron, aluminum, silver, nickel, an alloy of one or more of the above materials or a combination of one or more of the above materials, a polymer material or a ceramic material. The cylindrical housing 20 has an inner surface coated with an anti-interference layer, i.e. anti-reflective layer, that is, on the inner surface is formed one or more layers for absorbing light with specific wavelengths. The anti-interference layer may be made of a nickel layer, aluminum layer or polymer layer.

Figure 3:
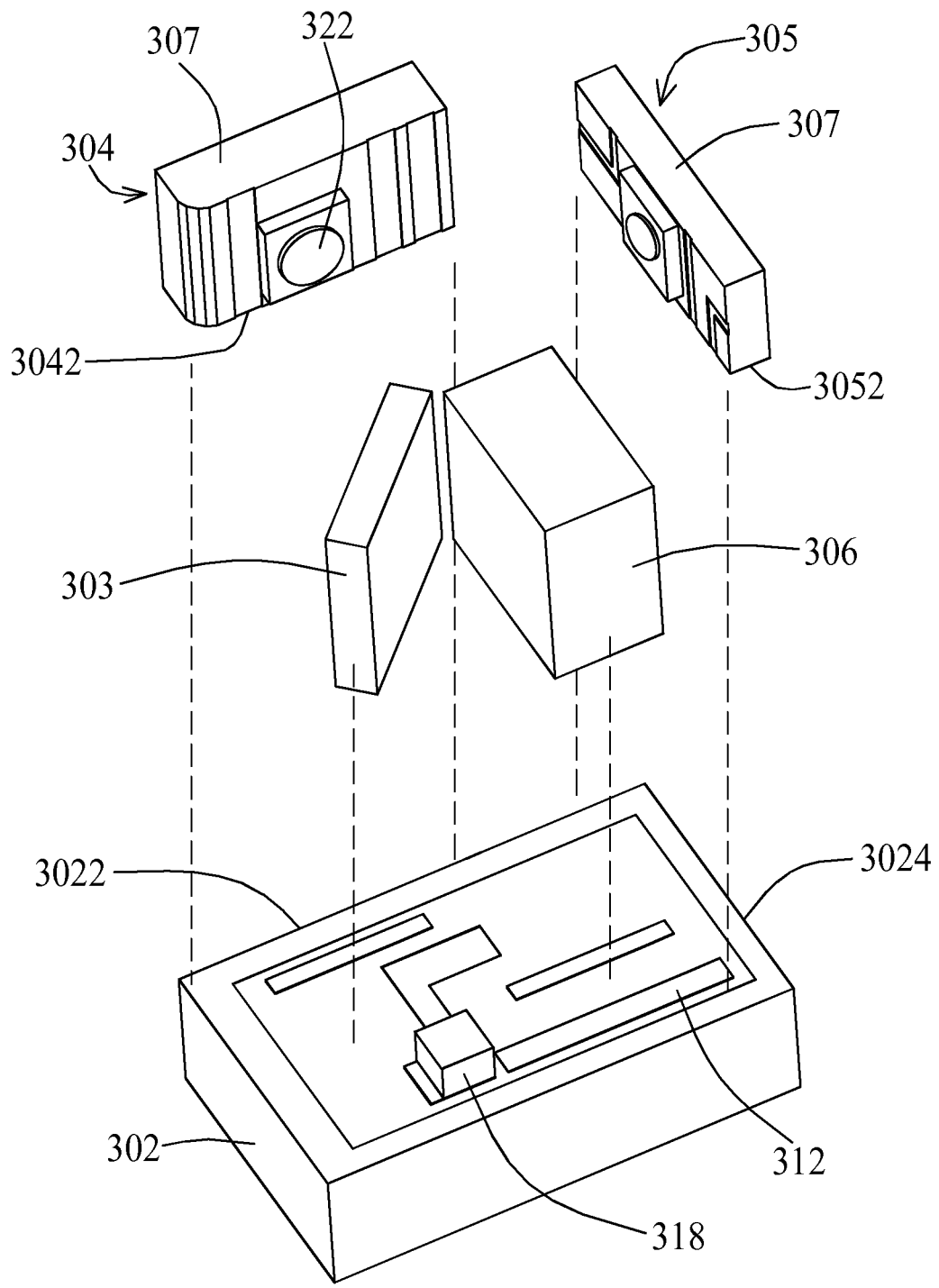
FIG. 3 is an exploded perspective view illustrating a wavelength locking module in accordance with the embodiment of the present invention.
Figure 4:
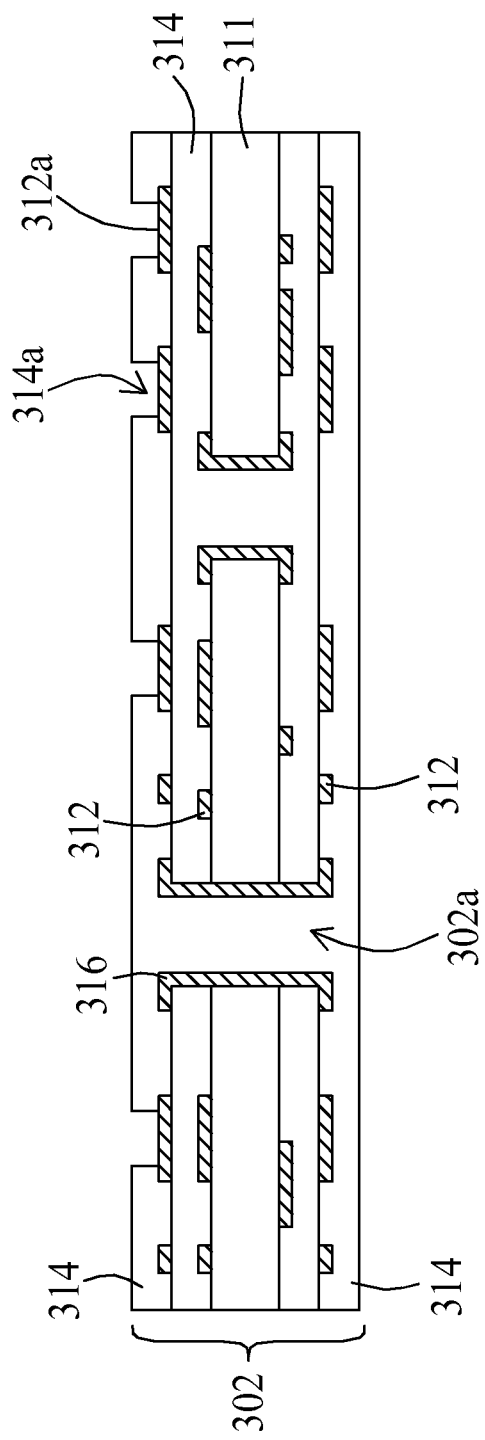
FIG. 4 is a cross-sectional view illustrating a substrate of the wavelength locking module in accordance with the embodiment of the present invention.
Figure 5:
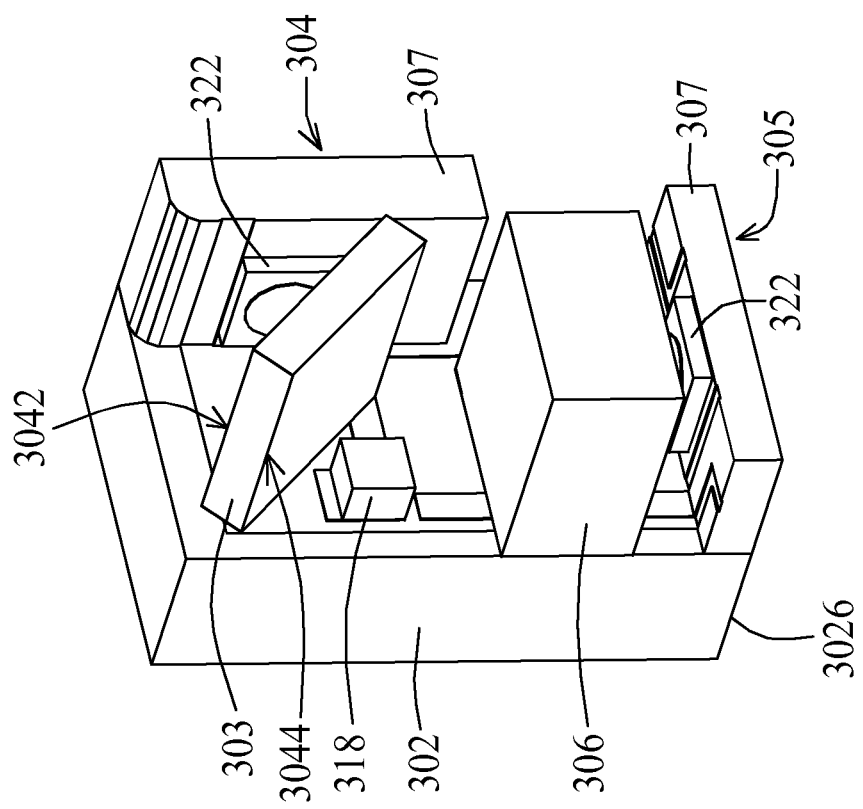
FIG. 5 is a perspective view illustrating the wavelength locking module in accordance with the embodiment of the present invention.

Referring to FIGS. 3-5, the wavelength locking module 30 includes a circuit board 302, optical splitter 303, first photodetector 304, second photodetector 305 and optical interferometer 306. The circuit board 302 may include a ceramic substrate, such as aluminum-oxide substrate, aluminum-nitride substrate or beryllium-oxide, patterned with circuits or printed circuit board. The Referring to FIG. 3, the circuit board 302 may include a core substrate 311 having multiple through holes 302a pass therethrough, multiple patterned metal layers 312, such as copper or aluminum layers, on the sidewalls of the through holes 302a in the core substrate 311, over a top surface of the core substrate 311 and under a bottom surface of the core substrate 311, and multiple insulating polymer layers 314 over the top surface of the core substrate 311 and under the bottom surface of the core substrate 311. Over and under the core substrate 311 respectively may be formed one or more of the patterned metal layers 312, such as two in this case, and one or more of the insulating polymer layers 314, such as three in this case. One of the patterned metal layers 312 in the through holes 302a may connect some of the patterned metal layers 312 over the top surface of the core substrate 311 and those under the bottom surface of the core substrate 311. The patterned metal layers 312 may include multiple metal pads 312a exposed by multiple openings 314a in the topmost and bottommost ones of the insulating polymer layers 314. A tin-containing solder may join passive devices 318, such as inductor coils, capacitors, resistors, variable resistors or thermistors, to the metal pads 312a.

Referring to FIGS. 1-5, the first and second photodetectors 304 and 305 are mounted onto the circuit board 302. The first photodetector 304 is provided with a circuit board 307 that may include a ceramic substrate, such as aluminum-oxide substrate, aluminum-nitride substrate or beryllium-oxide, patterned with circuits or printed circuit board. The circuit board 307 may be composed of a core substrate, like one 311 shown in FIG. 4, multiple patterned metal layers, like ones 312 shown in FIG. 4, such as copper or aluminum layers, on the sidewalls of multiple through holes, like one 302a shown in FIG. 4, in the core substrate 311, over a top surface of the core substrate and under a bottom surface of the core substrate, and multiple insulating polymer layers, like ones 314 shown in FIG. 4, over the top surface of the core substrate and under the bottom surface of the core substrate. The first photodetector 304 includes a photo-sensitive chip 322, for detecting optical signals, mounted on the circuit board 307 and electrically connected to the patterned metal layers of the circuit board 307 via a tin-containing solder or wirebonded wires. The photo-sensitive chip 322 may include a p-i-n (PIN) photodiode with an intrinsic (i.e., undoped) region in between its n-doped and p-doped regions, or complementary metal-oxide-semiconductor (CMOS) chip. The first photodetector 304 may have its circuit board 307 perpendicularly mounted onto a working surface 302a of the circuit board 302, wherein its circuit board 307 has a longitudinal sidewall attached alongside a longer edge 3022 of the working surface 302a of the circuit board 302 onto the working surface 302a of the circuit board 302. The patterned metal layers of the circuit board 307 of the first photodetector 304 may be electrically connected to the metal pads 312a of the circuit board 302 via wirebonded wires, a tin-containing solder or a conductive adhesive such that the photo-sensitive chip 322 may be electrically connected to the patterned metal layers 312 of the circuit board 302 through the patterned metal layers of the circuit board 307. Also, the second photodetector 305 includes another circuit board 307 and another photo-sensitive chip 322, similar with the first photodetector 304. The illustration for the second photodetector 305 can be referred to the illustration for the first photodetector 304. The second photodetector 305 may have its circuit board 307 perpendicularly mounted onto the working surface 302a of the circuit board 302, wherein its circuit board 307 has a longitudinal sidewall attached alongside a shorter edge 3024 of the working surface 302a of the circuit board 302 onto the working surface 302a of the circuit board 302.

Referring to FIGS. 1-5, the optical splitter 303, made of quartz or glass for example, has an incident surface 3042 configured to receive a main optical beam, such as laser beam arriving from an external optical source through the opening 202, to be split by the optical splitter 303 into a first split optical beam configured to be reflected from the incident surface 3042 of the optical splitter 303 to the photosensitive chip 322 of the first photodetector 304 and a second split optical beam configured to emitted from an exit surface 3044 of the optical splitter 303, opposite to its incident surface 3042, to the optical interferometer 306. The first photodetector 304 is configured to detect a first optical power or intensity of the first split optical beam and generate a first electronic signal in proportion to the first optical power or intensity. The optical splitter 303 is perpendicularly mounted onto the working surface 302a of the circuit board 302, wherein the optical splitter 303 has a sidewall attached to the working surface 302a of the circuit board 302. The main optical beam may pass to the incident surface 3042 at an angle of incidence between 15 and 75 degrees and preferably between 30 and 60 degrees. The passive device 318 may be a resistor whose resistance is dependent on temperature, i.e. thermistor, as shown in FIG. 3, adopted to provide a feedback signal to the thermo-electric cooler 40 to control the temperature of the optical interferometer 306, making the wavelength locking performance of the wavelength locker to be insensitive to the change of the operating ambient temperature.

Figure 6:
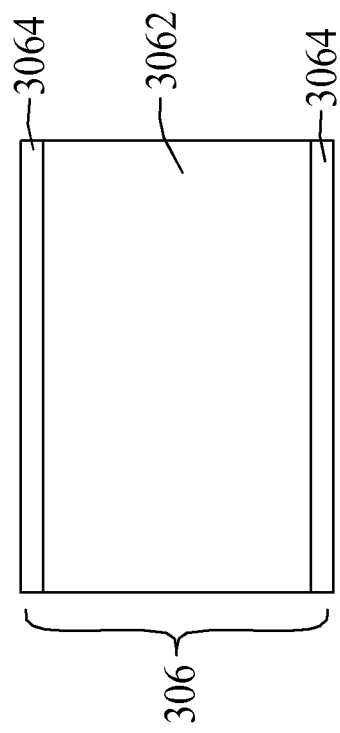
FIG. 6 is a cross-section view illustrating an optical filter of the wavelength locking module in accordance with the embodiment of the present invention.

Referring to FIGS. 3, 5 and 6, the optical interferometer 306, such as wavelength dependent optical interferometer or etalon, may be arranged on an optical path between the exit surface 3044 of the optical splitter 303 and the second photodetector 305. Typically, the optical interferometer 306 includes a transparent substrate 3062 and multiple reflective layers 3064 made of a silicon-dioxide layer, titanium-oxide layer, tantalum-oxide layer, niobium-oxide layer, magnesium-fluoride layer, chromium layer, chromium-oxide layer, combination of two or more of the above layers, or polymer layer, wherein the reflective layers 3064 has one or more, ranging from one to ten, such as one to five or four to ten, which has a total thickness between 500 angstroms and 2 micrometers, such as between 500 angstroms and 0.5 micrometers, between 0.1 and 1 micrometer or between 0.5 and 2 micrometers, formed on each of the top and bottom surfaces of the transparent substrate 3062. The optical interferometer 306 has an incident surface configured to receive the second split optical beam from the exit surface 3044 of the optical splitter 303 to be reflected alternately between an upper composite of the reflective layers 3064 on the top surface of the transparent substrate 3062 and a lower composite of the reflective layers 3064 on the bottom surface of the transparent substrate 3062 multiple times to generate interfered optical beams of the second split optical beam from an exit surface of the optical interferometer 306. The second photodetector 305 is configured to detect a second optical power or intensity of the interfered optical beams incident onto the photosensitive chip 322 of the second photodetector 305 and generate a second electronic signal in proportion to the second optical power or intensity, wherein the second optical power or intensity varies with a wavelength of the second split optical beam.

Figure 7:
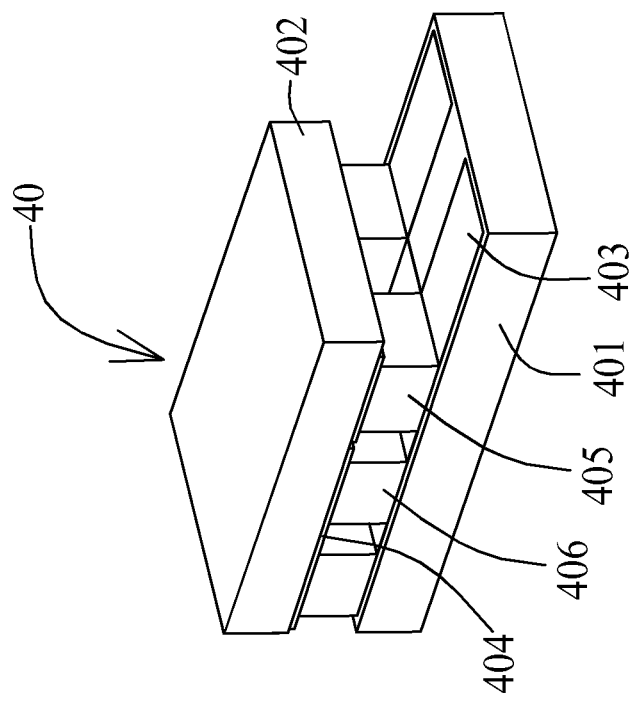
FIG. 7 is a perspective view illustrating a cooling device in accordance with the embodiment of the present invention.

For assembling the cylindrical package, the thermo-electric cooler 40 is first mounted onto the central circular portion 102 of the pedestal 10. Referring to FIG. 7, the thermo-electric cooler 40 includes a first ceramic substrate 401, a second ceramic substrate 402 over the first ceramic substrate 401, multiple first metal sheets 403 on a top surface of the first ceramic substrate 401, multiple second metal sheets 404 on a bottom surface of the second ceramic substrate 402, multiple P-type semiconductor chips 405, such as silicon chips, gallium-arsenide (GaAs) chips or germanium chips, each between one of the first metal sheets 403 and one of the second metal sheets 404, and multiple N-type semiconductor chips 406, such as silicon chips, gallium-arsenide (GaAs) chips or germanium chips, each between one of the first metal sheets 403 and one of the second metal sheets 404. The first metal sheets 403 may be electrically connected to one or more of the top ends 12a of the pins 12 protruding from the top surface of the central circular portion 102 as shown in FIG. 1 via wirebonded wires or a tin-containing solder.

Next, referring to FIGS. 1 and 2, a thermally conductive paste may be coated on a top surface of the second ceramic substrate 402 and then the wavelength locking module 30 has the circuit board 302 with a sidewall 3026 and the second photodetector 305 with a backside both mounted perpendicularly and horizontally respectively onto the top surface of the second ceramic substrate 402 of the thermo-electric cooler 40, wherein the thermally conductive paste is provided between the second ceramic substrate 402 and circuit board 302 and between the second ceramic substrate 402 and second photodetector 305 to increase thermal conductivity between the second ceramic substrate 402 and circuit board 302 and between the second ceramic substrate 402 and second photodetector 305. The thermally conductive paste may include silicone oil mixed with silver powder, zinc oxide, aluminum oxide and/or boron nitride. The circuit board 302 has the working surface 302a substantially parallel to a central axis of the pedestal 10. Alternatively, the thermally conductive paste may be omitted such that the sidewall 3026 of the circuit board 302 and the backside of the second photodetector 305 may contact the top surface of the second ceramic substrate 402. Next, a wirebonding or soldering process may be performed to form wirebonded wires of a tin-containing solder to electrically connect the circuit board 307 of the first photodetector 304 to one or more of the top ends 12a of the pins 12 protruding from the top surface of the central circular portion 102 as shown in FIG. 1. Next, the cylindrical housing 20 may have a ring-shaped outer flange, outward radially extending at its bottom, mounted onto the peripheral ring-shaped portion 104 by an adhesive such that the cylindrical housing 20 may enclose the central circular portion 102 of the pedestal 10, the thermo-electric cooler 40 and the wavelength locking module 30. The opening 202 may be arranged to have the main optical beam pass therethrough to the optical splitter 303. Alternatively, the optical lens 202a, if provided in the cylindrical package, may be also arranged to have the main optical beam pass therethrough to the optical splitter 303. The circuit board 302 has the working surface 302a substantially parallel to a central axis of the cylindrical housing 20. The main optical beam may pass to the incident surface 3042 of the splitter 303 at an angle of incidence between 15 and 75 degrees and preferably between 30 and 60 degrees for example.

Figure 8:
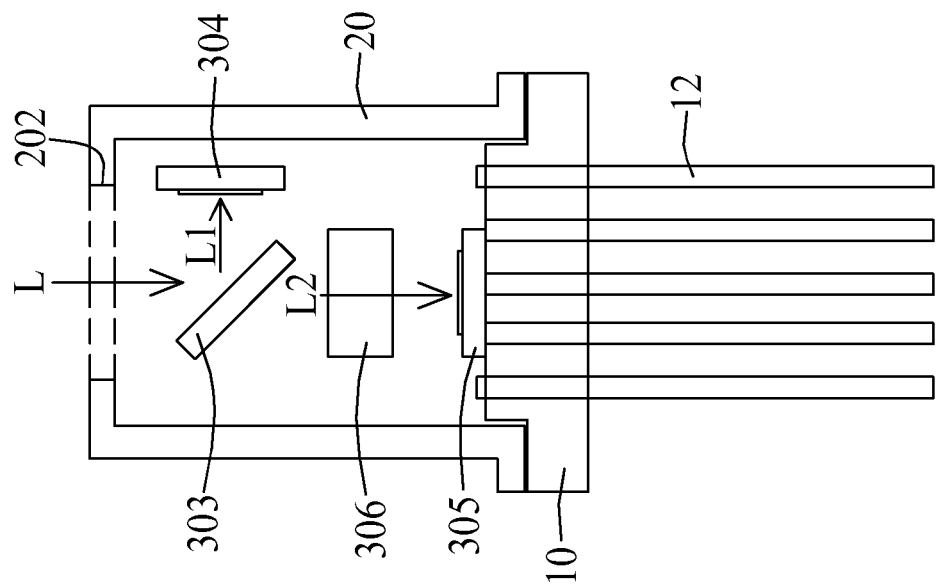
FIG. 8 is a schematic view illustrating optical beams propagating in the wavelength locking module in accordance with the embodiment of the present invention.

Referring to FIG. 8, the main optical beam L, i.e. optical signal, may pass through the opening 202 and optical lens 202a to the incident surface 3043 of the optical splitter 303, wherein the main optical beam is substantially coaxial with the central axis of the cylindrical housing 20. The optical splitter 303 may split the main optical beam L into the first split optical beam L1, i.e. first optical signal, and the second split optical beam L2, i.e. second optical signal, wherein the first and second split optical beams L1 and L2 may pass in parallel to the working surface 302a of the circuit board 302. The first split optical beam L1 passes to the photosensitive chip 322 of the first photodetector 304 for detecting or monitoring the first optical power or intensity of the first split optical beam L1. The second split optical beam L1 passes to the optical interferometer 306 for generating the interfered optical beams of the second split optical beam L2 to be emitted onto the photosensitive chip 322 of the second photodetector 305 for detecting or monitoring the second optical power or intensity of the interfered optical beams of the second split optical beam L2. Accordingly, the main optical beam L has a wavelength that may be determined whether to be changed based on the first and second optical powers or intensities. Further, the optical interferometer 306 is configured to filter wavelengths that may be tuned by the thermo-electric cooler 40 adjusting a temperature of the optical interferometer 306.

Accordingly, the cylindrical package may be applied to the wavelength locker in accordance with the present application. The wavelength locker may be arranged for a tunable laser module. Besides, in the cylindrical space surrounded by the cylindrical housing 20, the first and second photodetectors 304 and 305 and thermo-electric cooler 40 may be arranged to monitor the power and wavelength of the main optical beam L. Furthermore, compared to a traditional package for a wavelength locker, the cylindrical package in accordance with the present application may have a relatively small volume, a relatively low cost and precision easy to be adjusted.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A cylindrical package comprising:
   a cylindrical housing;
   a pedestal at a bottom of a cylindrical space surrounded by said cylindrical housing;
   a first circuit board in said cylindrical space, wherein said first circuit board has a working surface substantially parallel to a central axis of said cylindrical housing;
   an optical splitter in said cylindrical space, wherein said optical splitter has an incident surface configured to receive a main optical beam coaxial with said central axis and split said main optical beam into a first split optical beam and a second split optical beam;
   a first photodetector in said cylindrical space, wherein said first photodetector is configured to optically couple to said first split optical beam;
   a second photodetector in said cylindrical space, wherein said second photodetector is configured to optically couple to said second split optical beam; and
   a thermal-electric cooler in said cylindrical space and on said pedestal, wherein said second photodetector is attached onto said thermal-electric cooler;
   wherein said optical splitter, the first photodetector and the second photodetector are mounted onto said working surface, wherein said first split optical beam and said second split optical beam are substantially parallel to said working surface, wherein said second photodetector comprises a second circuit board with a bottom surface attached onto said thermal-electric cooler and a sidewall attached onto said working surface and a photosensitive chip on a top surface of said second circuit board, wherein said photosensitive chip optically couples to said second split optical beam.

2. The cylindrical package of claim 1 further comprising multiple pins passing through said pedestal and protruding from a top surface of said pedestal and a bottom surface of said pedestal.

3. The cylindrical package of claim 1, wherein said optical splitter has an incident surface configured to receive said main optical beam at an angle of incidence between 30 and 60 degrees.

4. The cylindrical package of claim 1 further comprising an optical interferometer in said cylindrical space, wherein said optical interferometer is in an optical path between said optical splitter and said second photodetector.

5. The cylindrical package of claim 4, wherein said optical interferometer comprises an Etalon filter.

6. The cylindrical package of claim 1, wherein said first circuit board has a sidewall attached onto said thermal-electric cooler.

7. The cylindrical package of claim 1 further comprising an optical lens optically coupling to said optical splitter, wherein said optical lens is in an optical path of said main optical beam.

8. The cylindrical package of claim 1 further comprising an optical interferometer in said cylindrical space, wherein said optical interferometer is in an optical path between said optical splitter and said second photodetector, wherein said optical interferometer is configured to receive said second split optical beam to be reflected alternately between two reflective layers of said optical interferometer multiple times so as to generate interfered optical beams of said second split optical beam, wherein said second photodetector is configured to detect an optical intensity of said interfered optical beams of said second split optical beam, and said first photodetector is configured to detect an optical intensity of said first split optical beam.

9. The cylindrical package of claim 1 is configured for a wavelength locker.

10. A cylindrical package comprising:
    a cylindrical housing;
    a pedestal at a bottom of a cylindrical space surrounded by the cylindrical housing;
    a thermal-electric cooler in said cylindrical space and on said pedestal;
    a first circuit board in said cylindrical space, wherein said first circuit board has a working surface substantially parallel to a central axis of said cylindrical housing and a sidewall attached onto said thermal-electric cooler;
    a photodetector in the cylindrical space, wherein said photodetector has a bottom surface attached onto said thermal-electric cooler and a sidewall attached onto said working surface, wherein said photodetector comprises a second circuit board with a bottom surface attached onto said thermal-electric cooler and a sidewall attached onto said working surface and a photosensitive chip on a top surface of said second circuit board; and
    an optical splitter in said cylindrical space and on said working surface, wherein said photodetector is configured to optically couple to said optical splitter.

11. The cylindrical package of claim 10, wherein said first circuit board comprises a ceramic substrate.

12. The cylindrical package of claim 10, wherein said optical splitter has an incident surface configured to receive a main optical beam coaxial with said central axis and split said main optical beam into multiple split optical beams, wherein one of said split optical beams optically couples to said photodetector.

13. The cylindrical package of claim 10 further comprising multiple pins passing through said pedestal and protruding from a top surface of said pedestal and a bottom surface of said pedestal.

14. The cylindrical package of claim 10 further comprising an optical interferometer in said cylindrical space and on said working surface, wherein said optical interferometer is in an optical path between said optical splitter and said photodetector.

15. The cylindrical package of claim 14, wherein said optical interferometer comprises an Etalon filter.

* * * * *